United States Patent [19]

Smrekar et al.

[11] 4,012,992

[45] Mar. 22, 1977

[54] HYDRAULICALLY OPERATED ATTACHMENT FOR MACHINE TOOLS

[75] Inventors: Donald E. Smrekar, Burlington; Peter Bilan, Burlington; James Hamilton, Campbellford, all of Canada

[73] Assignee: Parker-Hannifin Corporation, Cleveland, Ohio

[22] Filed: Nov. 12, 1975

[21] Appl. No.: 631,039

[52] U.S. Cl. .............................. 90/15 R; 90/11 R; 90/DIG. 1; 90/DIG. 13; 82/46; 83/488; 83/491; 83/591

[51] Int. Cl.² .......................................... B23C 7/02

[58] Field of Search ............ 90/11 R, 15 R, DIG. 1, 90/DIG. 13; 29/27 R, 27 A, 27 C; 82/46, 83, 100, 101; 83/491, 488, 489, 471.2, 591

[56] References Cited

UNITED STATES PATENTS

| 1,859,006 | 5/1932 | Schaad | 90/DIG. 1 |
| 2,301,028 | 11/1942 | Esch | 90/15 R |
| 2,690,703 | 10/1954 | Creek | 90/11 R |

*Primary Examiner*—Gil Weidenfeld
*Attorney, Agent, or Firm*—John N. Wolfram

[57] ABSTRACT

A hydraulically operated attachment for machine tools in which there is a gear drive between a rotary cutting tool and a rotary hydraulic motor. The rotation axes of the hydraulic motor, gears and cutting tool are parallel to each other for providing a compact arrangement that permits operation of the cutting tool on the work piece close to the collet that supports and rotates the latter.

10 Claims, 5 Drawing Figures

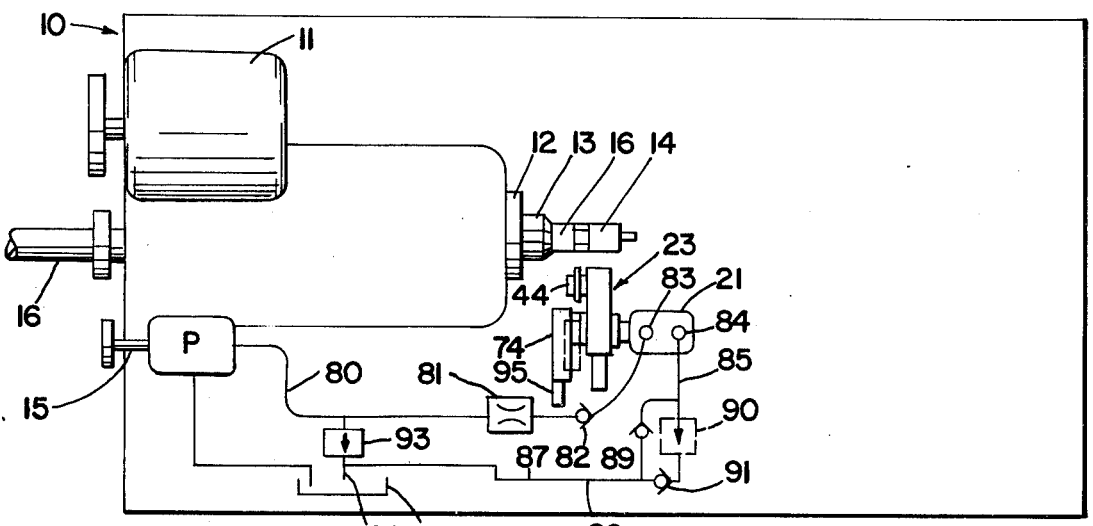
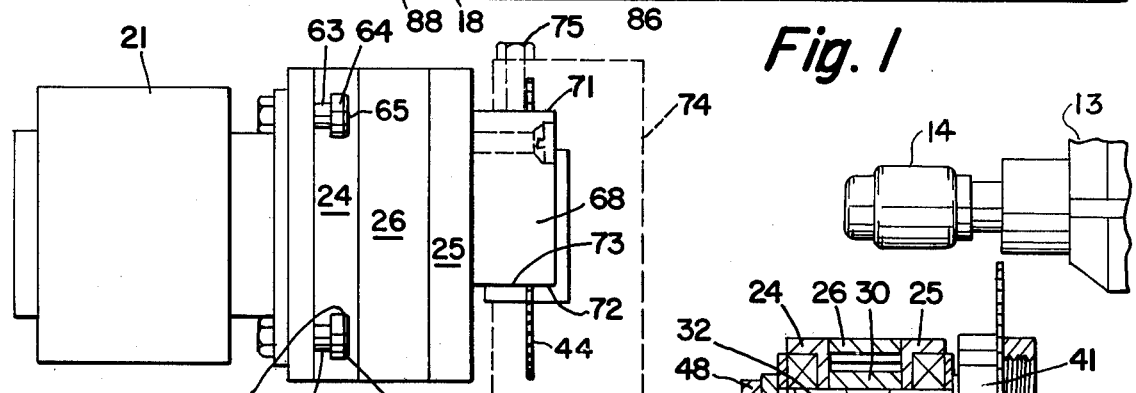
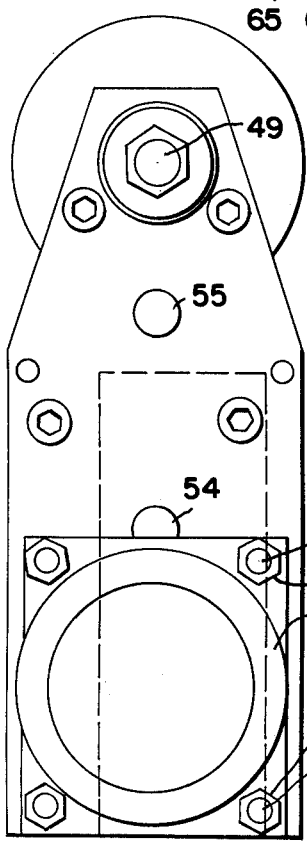
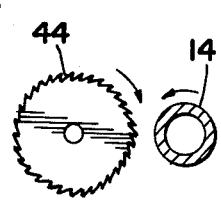
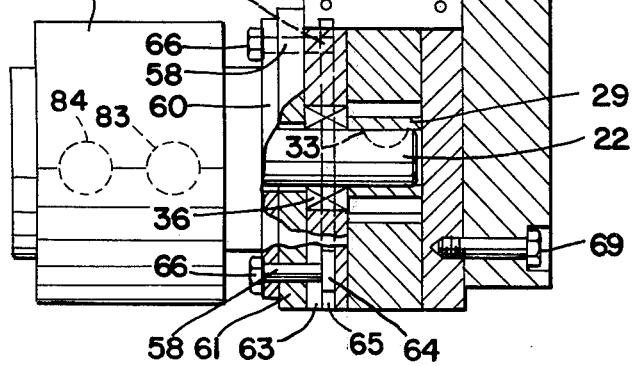

HYDRAULICALLY OPERATED ATTACHMENT FOR MACHINE TOOLS

BACKGROUND OF THE INVENTION

Machine tools, such as automatic lathes, automatic multiple spindle machines, chucking machines, and other forms of machine tools in which a work piece is rotated while being operated upon by various forming, drilling and other cutting tools, commonly use a non-rotating tool that is moved transversely into the rotating work piece for effecting operations such as turning, forming, grooving, sidemilling and/or cut-off of the finished piece from a bar of the raw material. Because these operations by non-rotating tools are time consuming, and in the case of cut-off, usually make a relatively wide cut and thereby waste metal, attachments have been developed for performing these operations with rotary cutting tools. Such attachments employ either electric motor driven shafts or mechanical drives from a power take-off shaft of the machine for imparting rotation to the cutting tool. Such attachments are costly and bulky.

Although a rotary cutting tool attachment that is driven by a hydraulic motor is disclosed in U.S. Pat. No. 2,301,028, such attachments heretofore have had little or no acceptance in industry. It is believed that a major reason for this is that such hydraulic attachment utilizes a belt drive between a hydraulic motor and the rotating tool and which belt drive is exposed to oil or other cutting fluids which could cause slippage and rapid deterioration of the belts. Furthermore, to encase the belt would require a bulky housing which would limit the usefulness of the attachment.

SUMMARY OF THE INVENTION

In the present invention, a hydraulically operated attachment is provided for rotating a cutting tool to operate on a rotating work piece. A hydraulic rotary motor drives the cutting tool through an encased set of gears so as to provide a positive drive which is protected against damage or malfunction due to external environment. The axes of the motor, gears, and cutting tool are parallel for efficient operation and for minimum bulk that also permits the cutting tool to operate close to the collet or chuck that holds the rotating work piece.

A pump for providing the motor with fluid under pressure is driven by a power take-off from the main motor of the machine tool for constant rotation of the cutting tool while the main motor is in operation.

Also, there is a simple hydraulic control system that includes a fixed orifice between the pump, which is of the positive displacement type, and the motor whereby the motor operates at substantially constant predetermined rotational speed.

DETAIL DESCRIPTION

FIG. 1 is a diagrammatic view of a machine tool with a hydraulically operated rotary cutting tool attachment.

FIG. 2 is a view partly in section, showing the attachment comprising a hydraulic motor, gear drive and the rotary cutting tool.

FIG. 3 is a side view of the hydraulic attachment.

FIG. 4 is an end view of the attachment.

FIG. 5 is a view of the cutting tool and the work piece.

As shown in FIG. 1, a machine tool 10 may have an electric motor 11 providing the basic power supply for the machine tool. The machine tool also has a rotary spindle 12 driven by motor 11 and including a collet 13 for gripping and rotating a work piece bar 16 projecting therefrom. There is also a power take off shaft 15 driven by motor 11 through a suitable drive train and which operates continuously while motor 11 is in operation.

Power take-off shaft 15 has an operative connection with a pump P for operating the same.

Pump P draws hydraulic fluid from a reservoir 18 and discharges it under pressure into a conduit 19 for delivery to a hydraulic motor 21. This motor is preferably of the geroter that is capable of transmitting high torque to a rotary output shaft 22. Motors of this type suitable for this service are Models A37, A62, and A25 made by Lamina, Inc., of Oak Park, Mich. The pump P may advantageously be a vane type pump Model No. 401 manufactured by Parker-Hannifin Corporation at Otsego, Mich.

A gear housing 23 is attached to motor 21. This housing comprises a pair of end plates 24, 25 with a hollow spacer plate 26 therebetween to form a closed chamber 27 in which a pair of gears 29 and 30 are mounted on shafts 22 and 32. Gear 29 has a key connection 33 to shaft 22, which is also the output shaft of hydraulic motor 21, so that gear 29 will be rotated by shaft 22. Shaft 22 is journaled in a bearing 36 that is pressed into an opening in plate 24.

Similarly, tool shaft 32 has a key connection 37 with gear 30 so as to be rotated by the latter and the tool shaft 32 is journaled in plates 24, 25 by way of bearings 38, 39 press fitted into blind recesses in plates 24 and 25.

Tool shaft 32 has an enlarged head 41 and an externally threaded extension 42 at one end. One side of head 41 fits against bearing 39 and the other side provides a shoulder 43 against which a saw blade or other cutting tool may be clamped by a nut 45 threaded onto extension 42. There may also be a key connection 46 between tool shaft 32 and tool 44 to ensure that the tool will rotate with the shaft.

Tool shaft 32 is retained on housing 23 by a nut 48 threaded onto the opposite end 49 of the tool shaft.

Mounted within housing 23 is a pair of idler gears 51, 52 respectively rotatably journaled on shafts 54, 55 that extend into openings in plate 24, 25 and are pinned thereto so as to be non-rotatable. Gear 51 meshes with gear 29 and with gear 52 and the latter additionally meshes with gear 30 so that rotation of gear 29 will cause rotation of gear 30. For simplicity of structure and mimimum envelope dimensions, shafts 22, 54, 55 and 32 are parallel with each other.

Motor 21 is fixedly attached to housing 23 by way of bolts 58 that pass through a flange 60 on the housing of motor 21, a plate 61 and into recessed slots 63 in plate 24. These bolts have heads 64 within recessed portions 65 of slots 63 to enable nuts 66 to be tightened on the bolts for clamping motor 21 fixedly against plate 61 and the latter against plate 24 and with shaft 22 in its proper position for accurately locating gear 29 within housing 23.

Plate 25 has a block 68 fixedly attached thereto by bolts 69. Block 68 is receivable within a channel 73 in a slide 74 that is movably mounted on the machine tool 10. Slide 74 is shown in dotted lines in FIG. 4, as is a set screw 75 that may be employed for securing block 68 within channel 73 of the slide. Block 68 has a pair of parallel sides 71, 72 that accurately fit between side surfaces of channel 73 in slide 74 whereby the block may be accurately positioned and clamped within such channel.

Slide 74 is a conventional portion of the machine tool 10 and is actuated at the proper time for moving toward work piece 14 in a direction generally transverse to the rotational axis of the latter and carries with it housing 23 and tool 44 so that the latter may operate on the work piece. Tool 44, as illustrated in the drawings, is a circular saw that may be employed to cut off work piece 14 from the bar material 16. Alternatively, tool 44 could be a milling cutter or other rotary tool for performing a grooving or other operation upon a work piece 14. Preferably, tool 44 rotates in an angular direction opposite to the rotation of the work piece, as illustrated in FIG. 5. With this arrangement, the speed with which the cutting surface of the tool 44 transverses the surface of work piece 14 at their point of engagement will be the differential in the surface speeds of the tool and work piece. Because the RPM of the tool and of the work piece remains the same throughout the operation, the relative surface speeds at the point of engagement will decrease as the tool cuts to a smaller diameter in the work piece. Thus, the maximum surface speed that can be tolerated is determined and then the RPM of the tool 44 is selected so that this maximum surface speed will result when the work piece 14 is rotating at a given RPM and the tool starts its cut at the largest diameter to be cut into the work piece. The surface speed when the tool finishes its cut on a smaller diameter of work piece 14 will then be a lesser value.

The hydraulic system for energizing motor 21 includes a conduit 80 for receiving the pressurized hydraulic fluid discharged by pump P and directing it first through a restricted orifice 81 and a check valve 82 to the intake port 83 of motor 21. The spent hydraulic fluid is then discharged from motor 21 through an outlet port 84 and through return lines 85, 86, 87 and 88 to reservoir 18, there being a quick disconnect type check valve 89 in one of the return lines. If desired, a counterbalance valve 90 and an additional check valve 91 may be employed as indicated in FIG. 1.

A pressure relief valve 93 connects high pressure line 80 to return line 88 to relieve any excess pressure that may be developed in conduit 80.

Orifice 81 is preferably of the fixed type and is specially selected and installed into the hydraulic system for a particular operation by a particular tool 44 on a work piece 14 so that no adjustment of orifice 81 will be required. However, orifice 81 may be of the variable type, in which case a given unit can be used for a number of different operations by merely adjusting the flow opening through the orifice.

To facilitate movement of housing 23 toward and away from work piece 14, the portions of conduits 80 and 85 that attach to motor 21 are flexible hose.

OPERATION

At the same time that motor 11 operates to rotate the machine tool spindle that carries collet 13 which grips and rotates bar stock 16, motor 11 also operates to drive pump P through a belt and pulley attached to pump shaft 15 so that pump P runs continuously when motor 11 is energized for turning bar stock 16. Pressure fluid from pump P will be discharged into conduit 80 and through orifice 81 and check valve 82 into inlet port 83 of pump 21 and cause the latter to rotate its output shaft 22. Rotation of the latter causes gears 29, 51, 52 and 30 to rotate and rotation of the latter causes tool shaft 32 and tool 44 to rotate and this rotation will be continuous while motor 11 is operating.

During the time that work piece 14 is being formed by other tools, not shown, slide 74 and hence attachment 23 will be in a retracted position in which tool 44 does not contact either bar 16 or work piece 14. Assuming that in this instance tool 44 is a circular saw to provide a cut-off operation, cam 95, or some other conventional means, will be automatically actuated to advance slide 74 toward bar 16 when work piece 14 is ready for cutoff. Advancement of slide 74 carries with it housing 23 and saw 44 so that the latter will engage bar 16 and perform the operation of cutting off work piece 14 therefrom. Upon completion of cutoff, cam 95 will be automatically actuated to retract slide 74 to await the next cutoff operation.

Although the invention has been illustrated and described as being applied to a rotary saw 44, it may be applied to other rotary cutting tools such as milling cutters and the like.

We claim:

1. In combination, a machine tool having means for supporting and rotating a work piece and having a slide movable toward said work piece, a hydraulic pump, means for driving the pump, a closed housing mounted on the slide for movement therewith, a rotary hydraulic motor separate of the housing but fixedly attached thereto for movement therewith and having a fluid connection with said pump so as to be driven by fluid discharged by the pump, said motor having a rotary output shaft, said housing enclosing a set of intermeshed gears, one of said gears being connected to said output shaft for rotation thereby, another of said gears being connected to a tool shaft for rotating the same, and a cutting tool secured to said tool shaft for rotation thereby.

2. The combination of claim 1 in which said support means provides a bearing support for both said output and tool shafts and the axes of rotation of said output shaft, gears and tool shaft are parallel.

3. In combination, a machine tool having means for supporting and rotating a work piece and having a slide movable toward said work piece, a hydraulic pump, means for driving the pump, a rotary hydraulic motor mounted on the slide for movement therewith and having a fluid connection with said pump so as to be driven by fluid discharged by the pump, said motor having a rotary output shaft, means supporting a set of intermeshed gears, one of said gears being connected to said output shaft for rotation thereby, another of said gears being connected to a tool shaft for rotating the same, and a cutting tool secured to said tool shaft for rotation thereby, said means for driving the pump being driven by the means for rotating the work piece and being continuously actuated thereby, and said motor being continuously actuated by said pump.

4. The combination of claim 3 in which said pump is of the fixed displacement type and there is a fixed orifice in said fluid connection whereby when the volumetric output of the pump remains constant the motor will operate at a substantially constant rate of rotation.

5. The combination of claim 1 in which said housing has a pair of undercut slots therein, and said motor is secured to the housing by bolts anchored in said slots, and whereby said motor may be located relative to said housing for proper alignment of said output shaft with said one gear by moving said bolts along said slots.

6. An attachment for a machine tool that has means for supporting and rotating a work piece, a slide movable toward the work piece in a direction generally transverse to the axis of rotation of the work piece, means for moving the slide, and a source of pressurized hydraulic fluid, said attachment comprising a closed housing, a hydraulic motor separate of the housing but fixedly attached thereto for movement therewith and having means for being fluidly connected to said source, said motor having a rotary output shaft, said housing enclosing a set of intermeshed gears, one of said gears being connected to said output shaft for rotation thereby, a tool shaft connected to another of said gears for rotation thereby, said tool shaft having a portion extending from one side of the housing and having means thereon for securing a tool to said tool shaft for rotation thereby, said housing having abutment means thereon for connection to said slide for movement therewith.

7. The attachment of claim 6 in which said tool shaft has another portion extending through an opening in an opposite side of said housing, and means secured to said other portion for retaining the tool shaft on said housing.

8. The attachment of claim 6 in which said motor and said abutment means are on opposite sides of said housing.

9. The attachment of claim 6 in which said housing is elongated and said motor output shaft is located near one end of the housing and the tool shaft is located near the opposite end of the housing.

10. The attachment of claim 6 in which said housing has a pair of side walls through which said tool shaft projects, each of said side walls having an outwardly facing recess, a bearing in each recess, and said tool shaft being journaled in said bearings.

* * * * *